United States Patent [19]

Leonard

[11] 3,925,088
[45] Dec. 9, 1975

[54] THERMALLY SENSITIVE INK

[75] Inventor: Joseph T. Leonard, Springfield, Va.

[73] Assignee: The United States of America as represented by the Secretary of the Navy, Washington, D.C.

[22] Filed: July 20, 1973

[21] Appl. No.: 381,119

[52] U.S. Cl. .................................. 106/20; 106/25
[51] Int. Cl.² ................... C09D 11/02; C09D 11/16
[58] Field of Search ........................... 106/20–23, 106/25, 31, 32

[56] References Cited
UNITED STATES PATENTS

| | | | |
|---|---|---|---|
| 1,844,199 | 2/1932 | Bicknell et al. | 106/21 |
| 3,000,298 | 9/1961 | Bryant et al. | 106/22 X |
| 3,460,964 | 8/1969 | Dunham | 106/21 X |
| 3,692,556 | 9/1972 | Cecconi | 106/31 X |

OTHER PUBLICATIONS

Ellis, Printing Inks, Reinhold Publishing Corp. N.Y., 1940, (pp. 253 and 490 relied on.)

*Primary Examiner*—Joan E. Welcome
*Attorney, Agent, or Firm*—R. S. Sciascia; Arthur L. Branning; Thomas McDonnell

[57] ABSTRACT

Oxidizers are added to a printing composition prior to its use in the printing of classified material so that, if necessary, the printing can be totally destroyed when it is burned.

4 Claims, No Drawings

THERMALLY SENSITIVE INK

BACKGROUND OF THE INVENTION

One of the more commonly used methods for emergency destruction of classified material such as documents, magnetic tapes and printed circuit boards is burning. However the results of the burning procedure are not always satisfactory, primarily because of the difficulty of achieving a suitable mixture of oxidizing agent and fuel. Paper, for example, carbonizes upon heating to form a char which does not burn rapidly itself, but forms a protective layer which interferes with the penetration of oxygen into the fire. After burning, the print on this charred paper is often legible. Thus, the result desired by the destruction of the document is often not obtained merely by burning.

SUMMARY OF THE INVENTION

By incorporating an oxidizer with the printing compound before printing, information written with the compound can be totally destroyed by burning.

It is therefore an object of the present invention to provide a method for the production of documents which can be quickly destroyed.

Another object of the invention is to provide a suitable means of providing an oxidizer so that documents can be easily destroyed.

Yet another object is to provide a printing composition containing its own oxidizer so that information printed with said composition can be easily destroyed.

Other objects, advantages and novel features of the invention will become apparent from the following detailed description of the invention.

DETAILED DESCRIPTION

The invention requires the addition of an oxidizer to a printing composition. More specifically, it relates to the addition of an oxidizer to carbon-based printing compositions, such as carbon base ink, so that when burned the print will be completely destroyed even though the paper may be only carbonized.

While many oxidizers which yield oxygen can be used, the preferred oxidizers are sodium nitrate, sodium chlorate, potassium nitrate, magnesium nitrate and ammonium nitrate.

The invention is based upon the reaction of the carbon in the printing composition with the oxygen released by the oxidizer to form carbon dioxide. This reaction occurs when the paper is burned. Thus, the quantity of oxidizer required is that quantity which will be sufficient to burn the carbon in the printing compound to carbon dioxide. This calculation can be made quite easily as illustrated by the following example:

EXAMPLE I

A sample of HIGGINS India Ink (produced by Higgins Ink Division, Newark, N.J.) comprising a carbon-black suspension was weighed. The sample was then allowed to evaporate to dryness. From the weight of the residue which was assumed to be mostly carbon it was determined that the ink contained 4.9% by weight of carbon. Thus, a 10 gram sample of the ink contains 0.49 grams of carbon (0.041 moles). Hence, 0.041 moles (1.31 grams) of oxygen is needed to burn the carbon to $CO_2$ if 10 grams of the ink is used.

In an actual experiment 11.3 grams of the ink was used and 1.47 grams of the oxygen was required. From the stoichiometry of the reaction between carbon and $NaNO_3$ to form $CO_2$ during burning it was calculated that 3.5 grams of $NaNO_3$ was needed to supply the oxygen required theoretically. However 3.9 g of $NaNO_3$ was dissolved in the India Ink by stirring with a magnetic stirrer. The excess $NaNO_3$ was used to further insure complete burning.

In order to illustrate the beneficial results obtained by using an ink containing an oxidizer the following examples are presented.

EXAMPLE II

The words "INDIA INK" were then printed on a piece of paper with HIGGINS India Ink not containing the oxidizer and the paper ignited with a match. After the fire burned out, the print was still legible on the charred residue of the paper.

The experiment was repeated, only this time the words "INDIA INK + $NaNO_3$" were printed on a similar piece of paper using the India Ink containing sodium nitrate produced by Example I. When ignited only large holes remained in the paper where the print had been. The experiment demonstrated that it is possible to burn the print off the paper under conditions which leave the paper in a charred condition.

EXAMPLE III

The words "INDIA INK" were printed on a piece of paper using the ink without the oxidizer additive. The words "INDIA+$NaNO_3$" were also printed on the same piece of paper except the ink containing the oxidizer produced by Example I was used. The paper was placed on a hot plate and allowed to ignite. Upon examination of the charred residue it was found that the words "INDIA INK" were still legible, while the words "INDIA + $NaNO_3$" had completely disappeared leaving large holes in the charred paper. It was also found that the addition of an oxidizer to carbon-based printing compounds, such as ink, does not render the ink susceptible to accidental ignition. While the print does burn completely when ignited, there is no rapid conflagration and, hence, no undue hazard exists in using a printing compound containing oxidizers.

Although the examples illustrate the use of India Ink as the printing compound, any carbon-based printing compound can be used since the critical element is the carbon which is needed to react and form carbon dioxide.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In a method of printing information with a carbon-based printing composition so that said information is capable of being totally destroyed by burning, the improvement which comprises:
   adding an oxidizer to said carbon-based printing composition prior to printing, said oxidizer being selected from the group consisting of sodium nitrate, sodium chlorate, potassium nitrate, magnesium nitrate and ammonium nitrate and said oxidizer being present in an amount at least equal to about the stoichiometric quantity required to oxidize the carbon present in said carbon-based printing composition to carbon dioxide.

2. In a method of printing information with a carbon-based ink so that said information is capable of being totally destroyed by burning, the improvement which comprises:

adding an oxidizer to said ink prior to printing, said oxidizer being selected from the group consisting of sodium nitrate, sodium chlorate, potassium nitrate, magnesium nitrate and ammonium nitrate and said oxidizer being present in an amount at least equal to about the stoichiometric quantity required to oxidize the carbon present in said carbon-based ink to carbon dioxide.

3. In a carbon-based printing composition the improvement comprising:

an oxidizer additive, said oxidizer additive being selected from the group consisting of sodium nitrate, sodium chlorate, potassium nitrate, magnesium nitrate and ammonium nitrate and said oxidizer additive being present in an amount at least equal to about the stoichiometric quantity required to oxidize the carbon present in said carbon-based printing composition to carbon dioxide.

4. In a carbon-based ink the improvement comprising:

an oxidizer additive, said oxidizer additive being selected from the group consisting of sodium nitrate, sodium chlorate, potassium nitrate, magnesium nitrate and ammonium nitrate and said oxidizer additive being present in an amount at least equal to about the stoichiometric quantity required to oxidize the carbon present in said carbon-based ink to carbon dioxide.

* * * * *